(12) United States Patent
Armiento et al.

(10) Patent No.: US 11,338,501 B2
(45) Date of Patent: May 24, 2022

(54) FABRICATION OF CIRCUIT ELEMENTS USING ADDITIVE TECHNIQUES

(71) Applicant: University of Massachusetts, Boston, MA (US)

(72) Inventors: Craig A. Armiento, Acton, MA (US); Kyle M. Homan, Pembroke, MA (US)

(73) Assignee: University of Massachusetts, Boston, MA (US)

( * ) Notice: Subject to any disclaimer, the term of this patent is extended or adjusted under 35 U.S.C. 154(b) by 242 days.

(21) Appl. No.: 16/371,817

(22) Filed: Apr. 1, 2019

(65) Prior Publication Data

US 2019/0299518 A1 Oct. 3, 2019

Related U.S. Application Data

(60) Provisional application No. 62/651,858, filed on Apr. 3, 2018.

(51) Int. Cl.
| | |
|---|---|
| *B29C 64/106* | (2017.01) |
| *B29C 64/393* | (2017.01) |
| *B29C 64/209* | (2017.01) |
| *B33Y 30/00* | (2015.01) |
| *B33Y 10/00* | (2015.01) |

(52) U.S. Cl.
CPC .......... *B29C 64/106* (2017.08); *B29C 64/209* (2017.08); *B29C 64/393* (2017.08); *B33Y 10/00* (2014.12); *B33Y 30/00* (2014.12)

(58) Field of Classification Search
CPC ... B29C 64/106; B29C 64/112; B29C 64/118; B29L 2031/3406; B29L 2031/3412; B29L 2031/3418; B29L 2031/3425; B29L 2031/3431; B29L 2031/3437; B29L 2031/3443; B29L 2031/345; B29L 2031/3456; B29L 2031/3462;
(Continued)

(56) References Cited

U.S. PATENT DOCUMENTS

| | | | | |
|---|---|---|---|---|
| 2003/0222738 A1* | 12/2003 | Brown | ................... | H01P 11/007 333/206 |
| 2011/0181376 A1* | 7/2011 | Vanhille | .................... | H01P 5/10 333/243 |

(Continued)

*Primary Examiner* — Joseph S Del Sole
*Assistant Examiner* — Manley L Cummins, IV
(74) *Attorney, Agent, or Firm* — Armis IP Law, LLC (57) ABSTRACT

A fabrication system is operable to form a structure (such as on a substrate) using a combination of a first (electrically) non-conductive material and a second (electrically) non-conductive. In one embodiment, the structure defined by the first material and the second material defines a void (passageway) in the structure. In one embodiment, exposed surfaces of the first non-conductive material and the second non-conductive material define the void in the structure. Subsequent to creating the structure including the void, the fabrication system fills the void (such as via injection) with an electrically conductive material. After the injected electrically conductive material (such as metal epoxy or other suitable material) solidifies, the fabrication system removes the first non-conductive material (sacrificial material) from the structure. The remaining second material provides structural support for the electrically conductive material.

18 Claims, 11 Drawing Sheets

(58) Field of Classification Search
CPC ..... B29L 2031/3481; B29L 2031/3487; B29L 2031/3493; B33Y 10/00
See application file for complete search history.

(56) References Cited

U.S. PATENT DOCUMENTS

| | | | |
|---|---|---|---|
| 2014/0231266 A1* | 8/2014 | Sherrer | B29C 64/106 205/136 |
| 2014/0291886 A1* | 10/2014 | Mark | B29C 64/209 264/163 |
| 2015/0077215 A1* | 3/2015 | Ranky | H05K 3/1258 338/47 |
| 2018/0050486 A1* | 2/2018 | Talgorn | B33Y 30/00 |
| 2018/0154573 A1* | 6/2018 | Miles | B29C 64/118 |

* cited by examiner

FABRICATION OF CIRCUIT ELEMENTS USING ADDITIVE TECHNIQUES

RELATED APPLICATIONS

This application is related to and claims the benefit of earlier filed U.S. Provisional Patent Application Ser. No. 62/651,858 entitled "FABRICATION OF CIRCUIT ELEMENTS USING ADDITIVE TECHNIQUES," filed on Apr. 3, 2018, the entire teachings of which are incorporated herein by this reference.

BACKGROUND

Conventional 3-D (three-dimensional) printers pattern thermoplastic materials using a plastic filament that is fed into a heated extruder. Most conventional 3-D printers do not have the capability to dispense conductive inks for patterning metallic traces within or on a printed 3-D object.

Performing a task such as printing metallic traces using standard 3D printers is challenging since these systems are set up for printing thermoplastic materials rather than metallic inks. Although there are hybrid systems that print both thermoplastics and conductive inks, these systems can only print conductive traces on a plane. The creation of vertical metallic interconnects (normal to the printing plane) or other shaped objects is not possible with conventional systems.

BRIEF DESCRIPTION OF EMBODIMENTS

Conventional fabrication implementing additive technology suffers from deficiencies. For example, although there are several hybrid printers that combine thermoplastics and micro dispensing of conductive inks, these systems are only capable of patterning conductive traces on flat surfaces (on the plane of the substrate). This disclosure includes the observation that new approaches are needed to enable fabrication of vertical metallic traces or other standalone 3-D objects made from electrically conductive material such as metal.

More specifically, in contrast to conventional techniques, embodiments herein include a fabrication system operable to, on a substrate, form a structure using a combination of a first (electrically) non-conductive material and a second (electrically) non-conductive material. In one embodiment, the structure defined by the first material and the second material includes a void (passageway of no material). In one embodiment, exposed surfaces of the first non-conductive material and the second non-conductive material define boundaries of the void in the structure.

Subsequent to creating the structure including the void, the fabrication system (or a technician manually) fills the void (such as via injection) with an electrically conductive material. In one embodiment, after the injected electrically conductive material (such as metal epoxy or other suitable material) solidifies, the fabrication system removes the first non-conductive material (sacrificial material) from the structure. The remaining second non-conductive material provides structural support for the electrically conductive material. Certain portions of the electrically conductive material may be exposed subsequent to removing the first nonconductive material.

In one embodiment, the fabrication system is operable to produce the structure and the void via application of multiple layers of the first non-conductive material and the second non-conductive material. This can include controlling movement of a first dispenser (such as a first printer head of a 3-D fabricator tool) to apply multiple additive layers of the first non-conductive material; the first non-conductive material being any suitable material such as a first fluid plastic. The fabrication system further controls movement of a second dispenser (such as a printer head of a 3-D fabricator tool) to apply multiple additive layers of the second non-conductive material to the structure; the second non-conductive material being any suitable material such as a second fluid plastic.

In accordance with further embodiments, the fabrication system is operable to apply heat to the first non-conductive material and the second non-conductive material to liquefy the first non-conductive material and the second non-conductive material to produce the structure. Subsequent to cooling (such as on the order of seconds or less or any suitable amount of time), the first non-conductive material and the second non-conductive material in the structure solidify.

As previously discussed, the first nonconductive material of a created structure can be sacrificial material removed in any suitable manner. Alternatively, the second material can be non-sacrificial material that is not removed.

In one embodiment, the fabrication system is operable to apply a liquid solution to the first non-conductive material in the structure to remove it. Application of the liquid dissolves away the first non-conductive material from the structure.

In one embodiment, removal of the first non-conductive material exposes a portion of the second non-conductive material and/or the electrically conductive material filling the void.

In accordance with still further embodiments, via the multiple layers of first non-conductive material and the second non-conductive material, the fabrication system creates a first port in the structure. The first port provides access to the void (passageway). The fabrication system is also operable to create a second port in the structure. The second port further provides access to the void in the structure. The fabrication system can be configured to produce the void and corresponding structure to include any number of ports to facilitate conveyance of the liquid conductive material.

Via further embodiments, the fabrication system injects the electrically conductive material into the first port through the void to the second port. In one embodiment, injection includes forcing the electrically conductive material in a liquid state into and through the void.

Subsequent to curing, the injected electrically conductive material in the void solidifies, resulting in an electrically conductive material object of any shape and size as defined by the void in the first non-conductive material and the second non-conductive material.

In one embodiment, the remaining second non-conductive material in the structure provides support for the electrically conductive material after removal of the first non-conductive material.

In accordance with still further embodiments, the fabrication system can be configured to cure the electrically conductive material filling the void to produce an antenna device or any other suitable electronic component.

Complex, multi-layer circuits can be embedded into 3D objects using the vias (metal objects) described herein. Vertical antennas, antenna arrays, and metallic waveguides can also be fabricated via embodiments herein.

These and other more specific additional embodiments are disclosed herein as further discussed below.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices) to: via controlled movement of a 3-D printer head, form a structure on a substrate using a combination of a first non-conductive material and a second non-conductive material, the structure including a void; fill the void with an electrically conductive material; and remove the first non-conductive material from the structure.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of fabricating devices using a 3-D printer. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the DETAILED DESCRIPTION section (which is a summary of embodiments) and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In one general embodiment, this disclosure describes a subtractive approach for patterning vertical metallic traces using standard 3-D thermoplastic printers. The fabrication of vertical metallic structure is based on the use of a dissolvable plastic that can be printed together with a non-dissolvable thermoplastic material in conventional 3-D printers. Further embodiments herein are discussed below.

Figure 1:
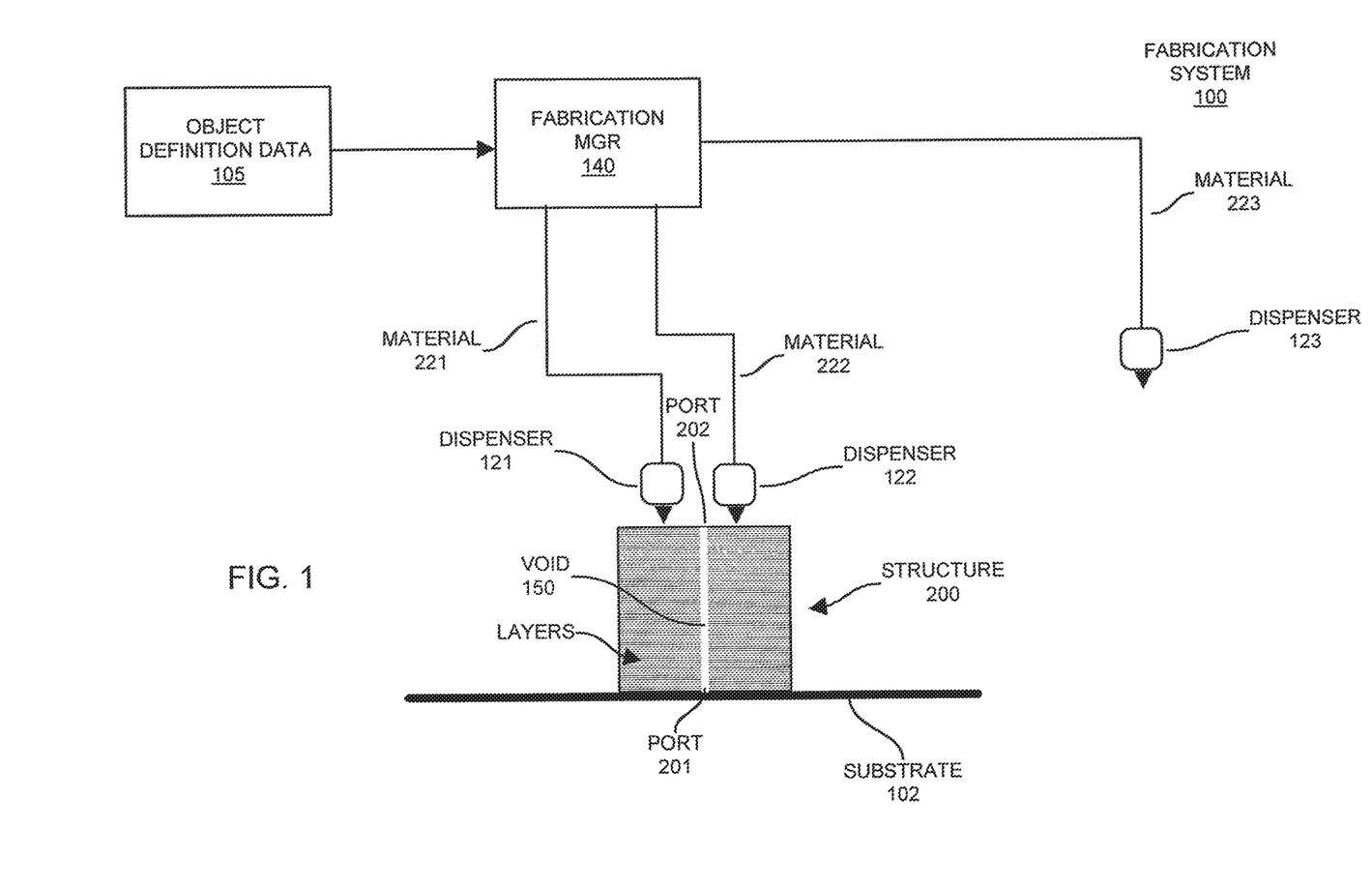
FIG. 1 is an example diagram illustrating a fabrication system according to embodiments herein.

Now, more specifically, FIG. 1 is an example diagram illustrating a fabrication system according to embodiments herein.

As shown, fabrication system 100 includes fabrication manager 140 and fabrication system 100 operable to form a structure 200 (such as on a substrate 102) using a combination of a first (electrically) non-conductive material 221 and a second (electrically) non-conductive material 222. The object definition data 105 defines physical attributes of the structure 200 being created.

The first material 221 and second material 222 can be any suitable matter such as plastics. In one non-limiting example embodiment, the second material 222 is ABS (Acrylonitrile Butadiene Styrene) and first material 221 is a dissolvable counterpart HIPS (High Impact Polystyrene). In accordance with further embodiments, the first material and second material may be the same material such as sacrificial material or non-sacrificial material.

As further described herein, embodiments include fabricating one or more sides of an object using sacrificial material (such as dissolvable material) and non-dissolving conductive material (ABS) and then dissolving the sacrificial material (such as HIPS through chemical treatment) to expose a free standing metallic structure.

In one embodiment, the structure 200 defined by the first material 221 and the second material 222 includes a void 150 (passageway, chamber, etc.). The void 150 in structure 200 is defined by exposed surfaces of the first non-conductive material 221 and the second non-conductive material 222.

Via controlling left, right, up, and down movement of the dispenser 121 and the dispenser 122, the fabrication manager 140 is operable to produce the structure 200 and the corresponding void 150 via application of multiple layers of the first non-conductive material 221 and the second non-conductive material 222.

In one embodiment, the fabrication manager 140 controls movement of a first dispenser 121 (such as first printer head of a 3-D fabricator tool) to apply multiple additive layers of the first non-conductive material 221. The first non-conductive material 221 can be any suitable material such as a first fluid plastic.

Further, the fabrication manager 140 controls movement of a second dispenser 122 (such as a second printer head of a 3-D fabricator tool) to apply multiple additive layers of the second non-conductive material 222 to structure 200. The second non-conductive material 222 can be any suitable material such as a second fluid plastic.

In accordance with further embodiments, the fabrication manager 140 (via control of dispenser 121 and dispenser 122) applies heat to the first non-conductive material 221 and the second non-conductive material 222 to liquefy the first non-conductive material 221 and the second non-conductive material 222 to produce the layers of structure 200. Subsequent to cooling (such as on the order of seconds or less or any other suitable time value), the first non-conductive material 221 and the second non-conductive material 222 in the structure 200 solidify.

Subsequent to creating the structure 200 including the void 150, the fabrication manager 140 controls dispenser 123 to fill the void 150 (such as via injection) with an electrically conductive material 223 (such as liquid epoxy or other suitable material) via dispenser 123.

After the injected electrically conductive material (such as metal epoxy or other suitable material) solidifies, the fabrication manager 140 (or other suitable resource) removes the first non-conductive material 121 (sacrificial material) from the structure 200. The remaining second material 222 provides structural support for the electrically conductive material dispensed into the void 150.

In accordance with alternative embodiments, the first material 221 may be a non-sacrificial material similar to the second material 222. In such an instance, the second material of structure 200 is not removed during the fabrication process. In such an instance, the resulting structure 200 includes the first material 221, second material 222, and the filled void.

In accordance with still further embodiments, via the multiple layers of first non-conductive material 221 and second non-conductive material 222, the fabrication manager 140 can be configured to create a first port 201 (such as opening, void, etc.) in the structure 200. The first port 201 provides access to the void 150 (passageway). The fabrication manager 140 is also operable to create a second port 202 in the structure 200. The second port 202 provides access to the void 150 in the structure 200 as well.

In accordance with further embodiments, the fabrication manager 140 injects the electrically conductive material 223 into the first port 201 through the void 150 to the second port 202. Injection can include forcing the electrically conductive material 223 while in a liquid state into and through ports 201, 202 and void 150. Alternatively, note that a human technician can manually inject the electrically conductive material 223 into the first port 201 through the void 150 to the second port 202. Injection can include forcing the electrically conductive material 223 in a liquid state into and through void 150.

Subsequent to curing, the injected electrically conductive material 223 in the void 150 solidifies, resulting in an electrically conductive material object (such as a coil, waveguide, conductive strip, etc.) of any shape and size as defined by the void 150 in the structure 200.

Figure 2A:
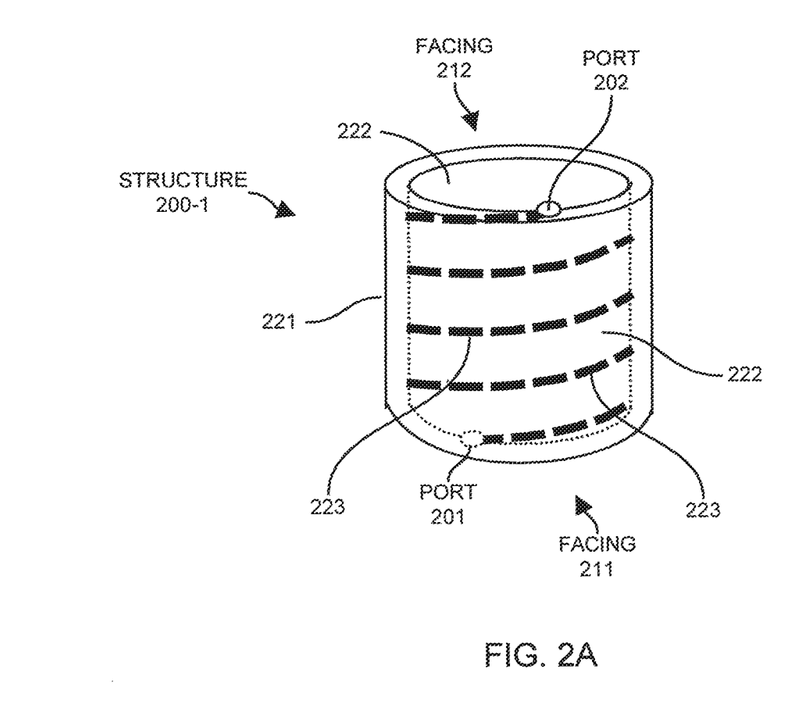
FIG. 2A is an example diagram illustrating a structure formed from multiple different types of material according to embodiments herein.

FIG. 2A is an example diagram illustrating a structure formed from multiple different types of material according to embodiments herein.

As shown, the final structure 200-1 produced by the fabrication manager 140 includes a combination of the first material 221 and second material 222 defining a corresponding void extending from port 201 disposed on facing 211 to port 202 disposed on facing 212.

In one embodiment, the material 222 of structure 200-1 is cylindrical in shape. The material 221 of structure 200-1 is tubular in shape. The void 150 disposed at an interface in between portions of the first material 221 and the second material 222 is a helical, spring-like pattern (such as an antenna device).

As previously discussed, the first nonconductive material 221 can be sacrificial material removed in any suitable manner. In one embodiment, the fabrication manager 140 (or other suitable resource) is operable to apply a liquid solution to the first non-conductive material 221 in the structure 200-1 to remove it.

Figure 2B:
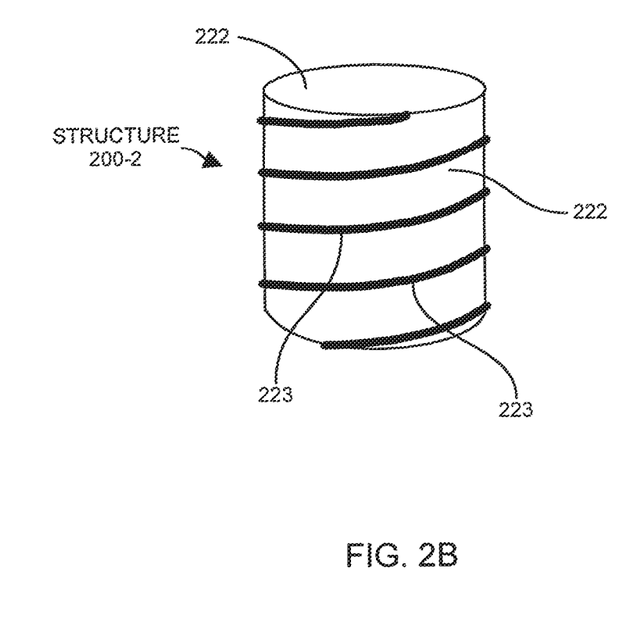
FIG. 2B is an example diagram illustrating a view of a core structure after removal of sacrificial material according to embodiments herein.

Application of the liquid dissolves away the first non-conductive material 221 from the structure 200-1 to produce the structure 200-2 in FIG. 2B. Removal of the first non-conductive material 221 exposes a surface portion of the second non-conductive material 222 and the corresponding electrically conductive material 223 used to fill the void 150.

As previously discussed, note again that material 221 can be a non-sacrificial material.

FIG. 2B is an example diagram illustrating a view of a core structure after removal of sacrificial material according to embodiments herein.

In one embodiment, the remaining second non-conductive material 222 in the structure 200 after removal of the first non-conductive material 222 provides support for the electrically conductive material 223 in the void 150.

In accordance with still further embodiments, the fabrication manager 140 can be configured to cure the electrically conductive material filling the void 150 to produce an antenna device or any other suitable electronic component.

Alternatively, a human technician or assembler can manually cure the electrically conductive material in the void 150 to produce an antenna device or any other suitable electronic component.

Figure 3:
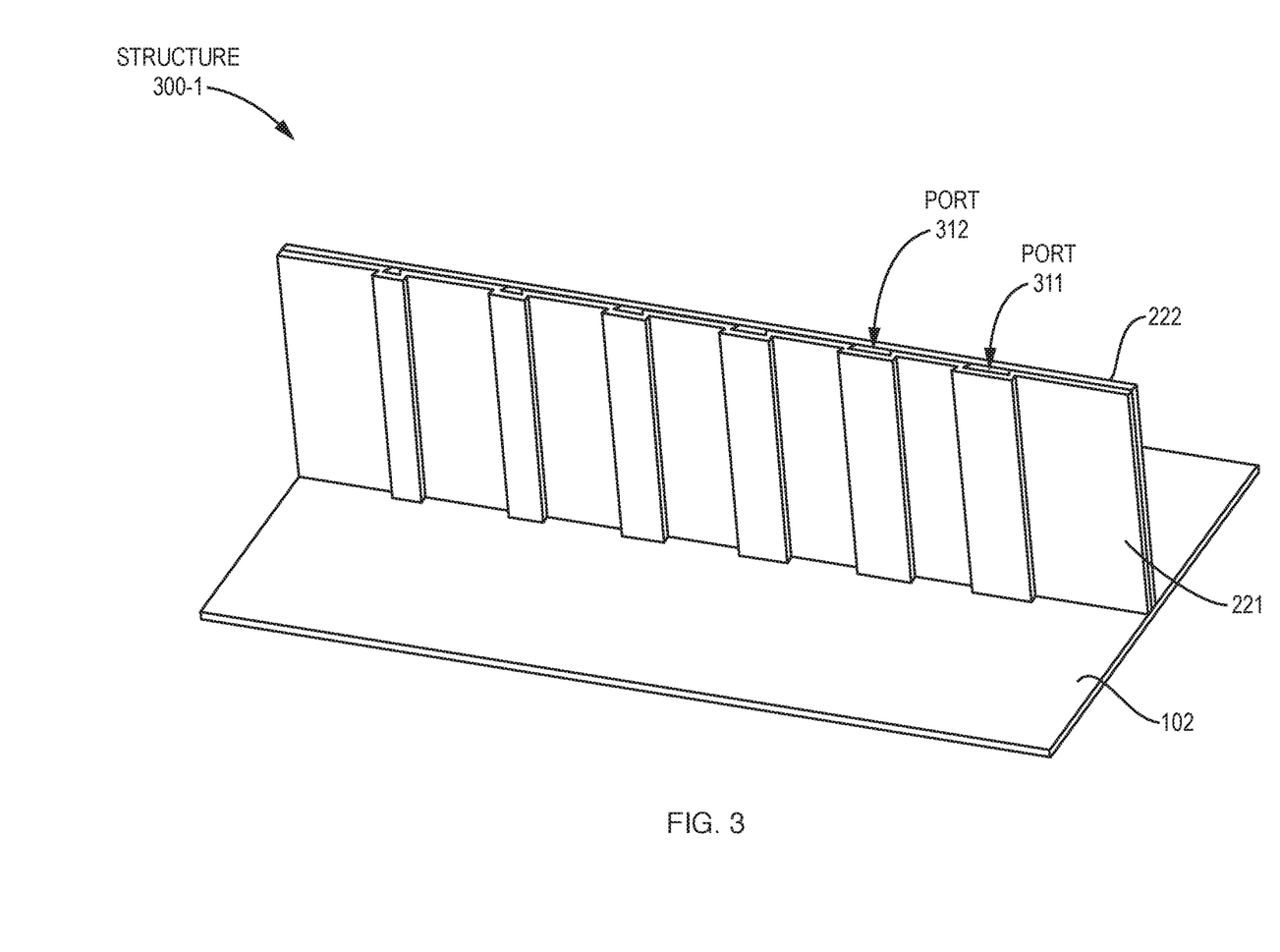
FIG. 3 is an example diagram illustrating a sample structure created from multiple different types of material according to embodiments herein

FIG. 3 is an example diagram illustrating a sample structure created from multiple different types of material according to embodiments herein.

As shown, structure 300-1 includes material 221 and material 222 disposed on a respective substrate 102. The combination of first material 221 (in back side of structure 300-1) and second material 222 (in back side of structure 300-1) create ports 311, 312, etc.

In this non-limiting example embodiment, structure 300-1 is a chimney type structure in which first material 221 and second material 222 are simultaneously printed on substrate 102 using a dual head printer. A width of the chimney structure (hollow region in between material 221 and material 222) can be designed into a CAD file that drives the fabrication manager 140 to control the dual head printer.

Subsequent to fabricating the structure 300-1, the fabrication manager 140 or technician injects electrically conductive material 223 in the corresponding ports 311, 312, etc.

More specifically, after printing, the chimney structure is filled with a conductive material 223 from the top. This can be done by hand using a syringe-based dispensing system or through an automated dispensing system such as dispenser 123 of fabrication system 100 (FIG. 1). The conductive material 223 can be a material such as metallic-loaded ink or epoxy. Once the metallic material is thermally treated to harden it (this step is not always required) the dissolvable material (material 221) is selectively removed using a chemical process. Alternatively, as previously discussed, the material 221 is not removed.

Figure 4:
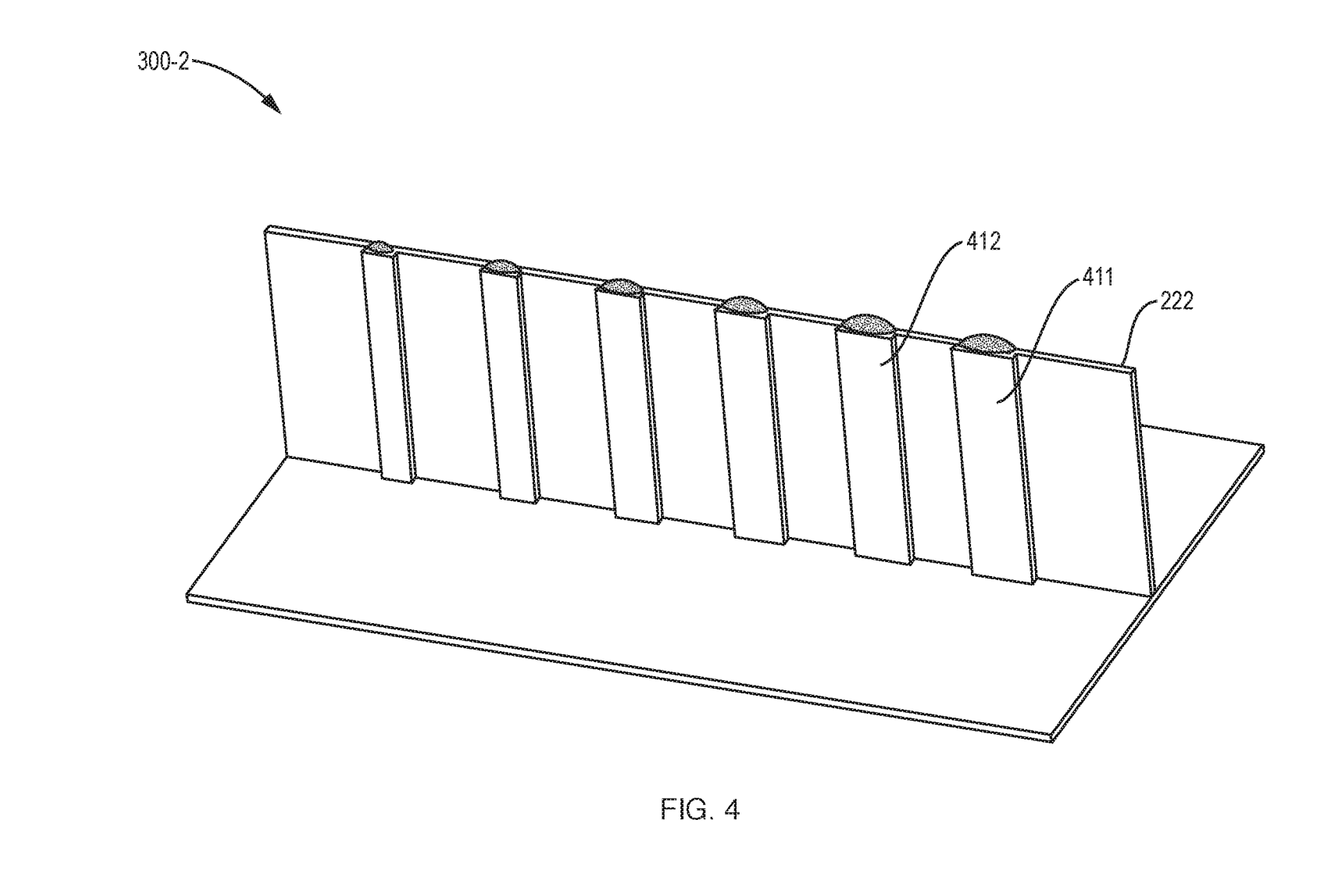
FIG. 4 is an example diagram illustrating a view of a core structure after removal of sacrificial material according to embodiments herein.

FIG. 4 is an example illustrating a view of a core structure after removal of sacrificial material according to embodiments herein.

In a manner as previously discussed, the fabrication manager 140 removes the first material 221 to expose the respective conductive strips 411, 412, etc. For the ABS/HIPS material combination, immersion in a Limonene solution dissolves the HIPS-(material 221) chimney without attacking the ABS (material 222). FIG. 4 shows a sample that was fabricated with multiple-width vertical traces.

Figure 5:
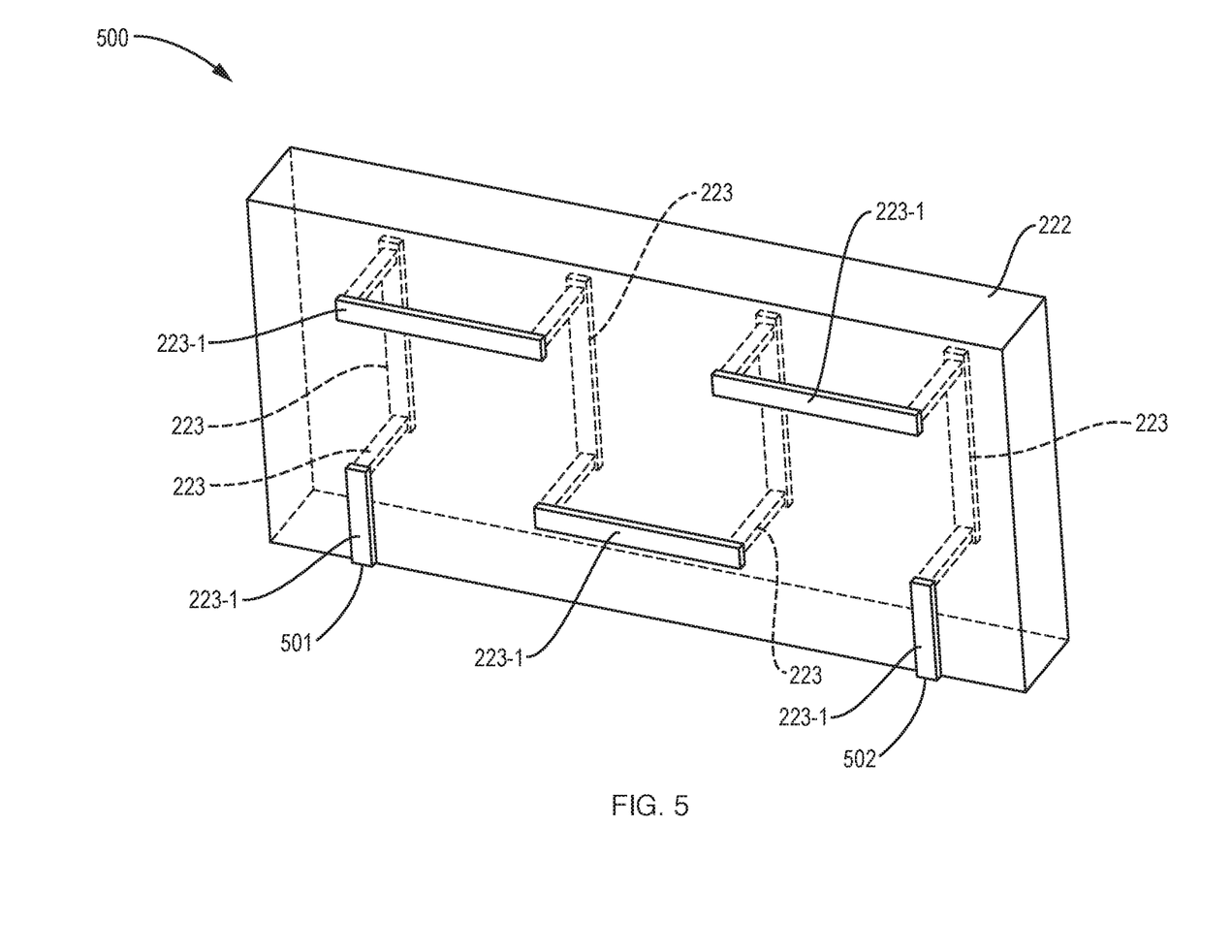
FIG. 5 is an example diagram illustrating a sample structure created from multiple different types of material according to embodiments herein

FIG. 5 is an example diagram illustrating a sample structure created from multiple different types of material according to embodiments herein.

In this example embodiment, structure 500 produced by the fabrication manager 140 includes a void extending from port 501 to port 502.

In a manner as previously discussed, the fabrication manager 140 or technician injects electrically conductive material through port 501 to fill the respective void. Removing of the first material 221 exposes the electrically conductive material 223-1, while electrically conductive material 223 is not exposed because it is inside of material 222.

Figure 6:
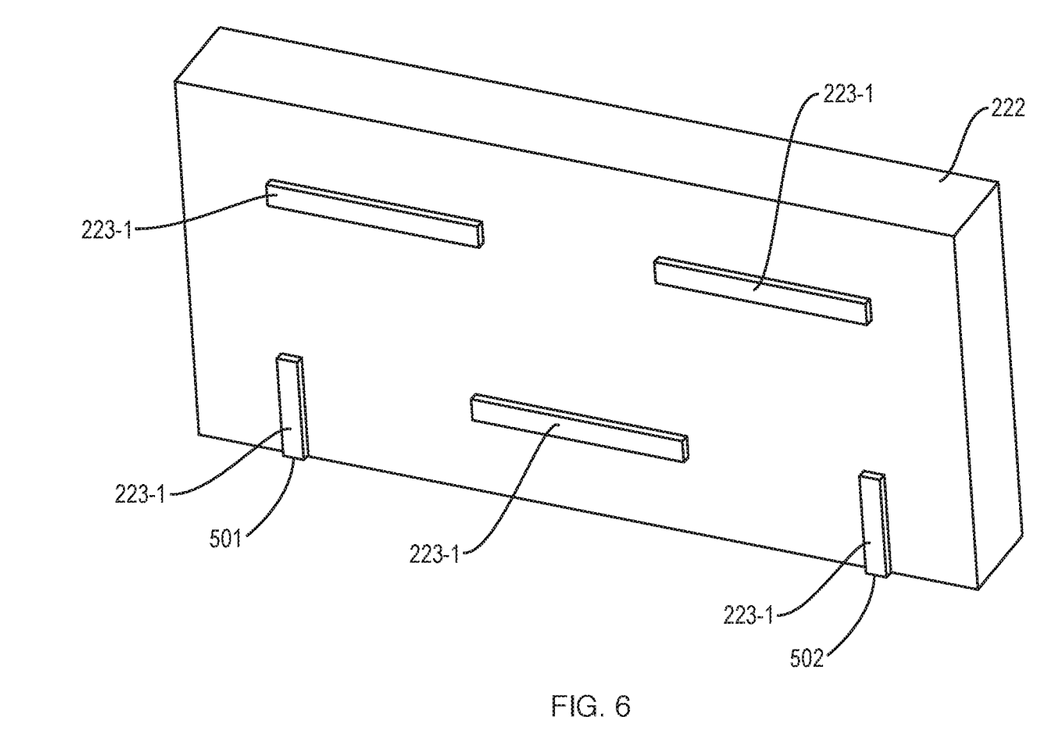
FIG. 6 is an example diagram illustrating a view of a core structure after removal of sacrificial material and addition of electrically conductive material in respective voids according to embodiments herein.

The fabrication techniques as discussed herein can be used to fabricate vertical interconnects within a 3D printed object. A very common structure used in conventional Printed Circuit Boards (PCBs) are conductive, vertical traces called "vias" that interconnect multiple layers of conductive traces. The process for printing a vertical trace described in this disclosure enables the use of 3D printers to create multiple-layer PCBs. FIG. 5 depicts one embodiment of a process to fabricate internal conductive vias within a printed PCB. FIG. 6 shows a design of a thermoplastic block printed with empty channels for subsequent formation of conductive vias. The design in FIGS. 5 and 6 can be used to print the block with its open channels. Conductive ink/epoxy can then be drawn into the voids of block (such as formed by material 222) using a vacuum source.

FIG. 6 is an example diagram illustrating a view of a core structure (printed block) after removal of sacrificial material according to embodiments herein.

As previously discussed, the empty channels were filled with conductive ink/epoxy using a vacuum technique to draw the conductive material through the channel structure.

FIGS. 7A, 7B, 7C, and 7D are example diagrams illustrating generation of a chimney (or rectangular waveguide) structure according to embodiments herein.

In a similar manner as previously discussed, the fabrication manager 140 as described herein can be configured to produce an object of any shape. In one embodiment, the fabrication manager 140 produces a respective structure in which to create a rectangular waveguide.

There are many high frequency electrical packaging applications which would benefit from a miniature, printed, hollow metallic waveguide 750. These waveguides can be used within a microwave module to connect devices and/or interface with external connectors. These can be fabricated using the disclosed process by using the waveguide fabrication structure shown in the CAD drawing in FIG. 7A.

Figure 7A:
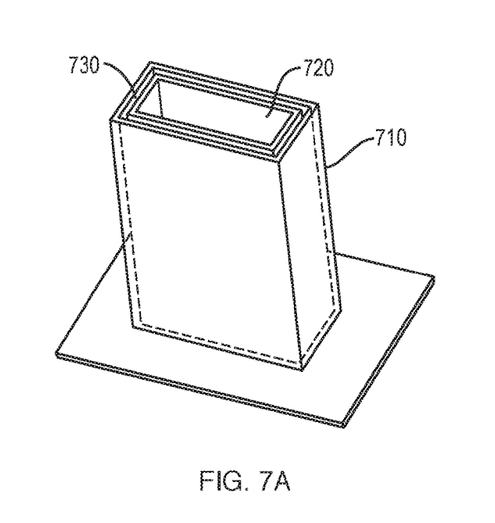
FIGS. 7A, 7B, 7C, and 7D are example diagrams illustrating generation of a chimney structure or waveguide according to embodiments herein.
Figure 7B:
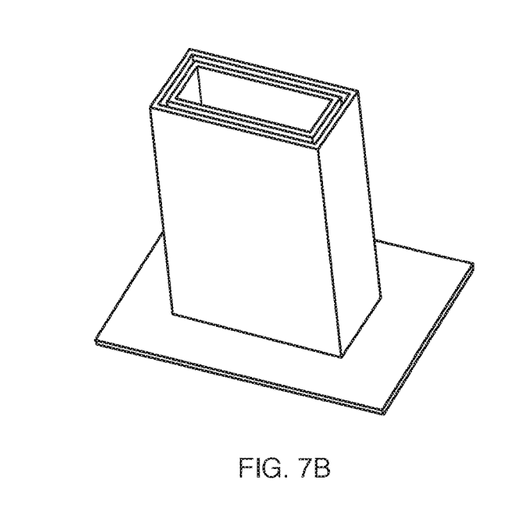
Figure 7C:
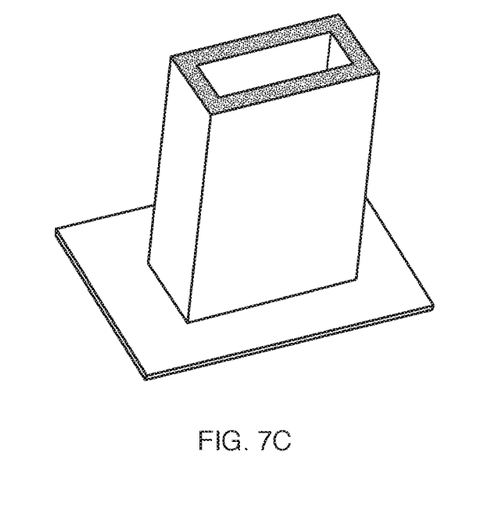
Figure 7D:
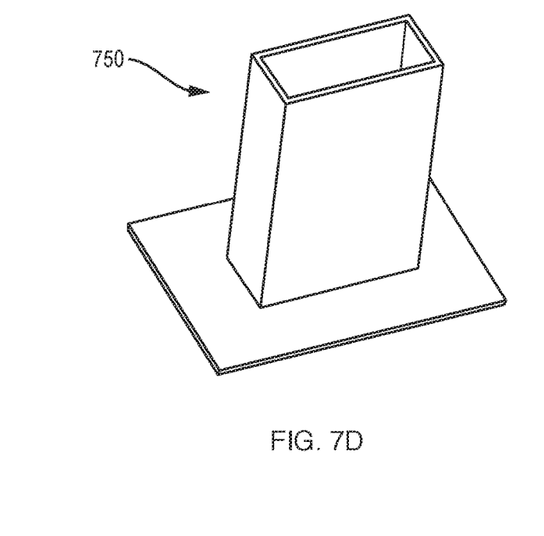

In one embodiment, the rectangular housing 710 is printed in the non-dissolvable material (typically ABS) material 222 and the inner rectangular core 720 is printed in the dissolvable material (typically HIPS, material 221) and the gap 730 between the ABS and HIPS material is filled with the conductive material 223. After thermal treatment of the metal (if necessary), the inner core 720 of the waveguide is cleared out by dissolving the HIPS material. FIG. 7D shows a photo of a hollow metallic waveguide 750 fabricated using this technique.

Figure 8:
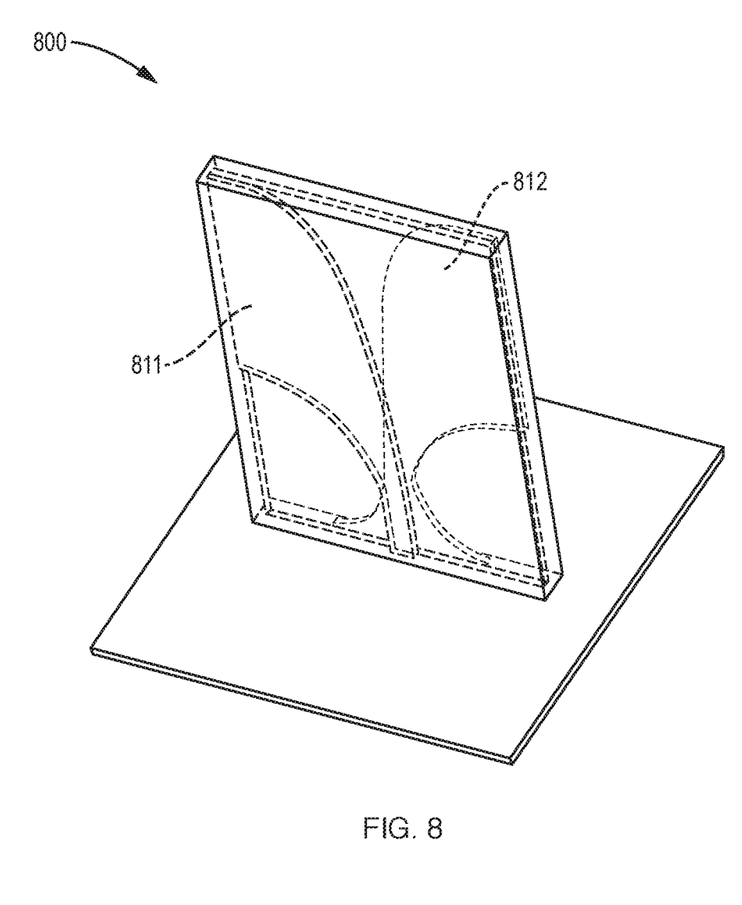
FIG. 8 is an example diagram illustrating a sample structure created from multiple different types of material according to embodiments herein

FIG. 8 is an example diagram illustrating a sample structure created from multiple different types of material according to embodiments herein.

In a similar manner as previously discussed, the fabrication manager 140 produces a respective antenna structure 800 including void 811 and void 812. The fabrication manager 140 then fills the void 811 and 812 to produce antenna element 911 (in FIG. 9A) and antenna element 912 (in FIG. 9B).

The disclosed process can be used to create free standing vertical structures that can be used to create devices such as miniature antennas. If the chimney structure is fabricated with the dissolvable material on all four sides, as shown in FIG. 8 then dissolving the material will result in a free standing metallic structure.

Figure 9A:
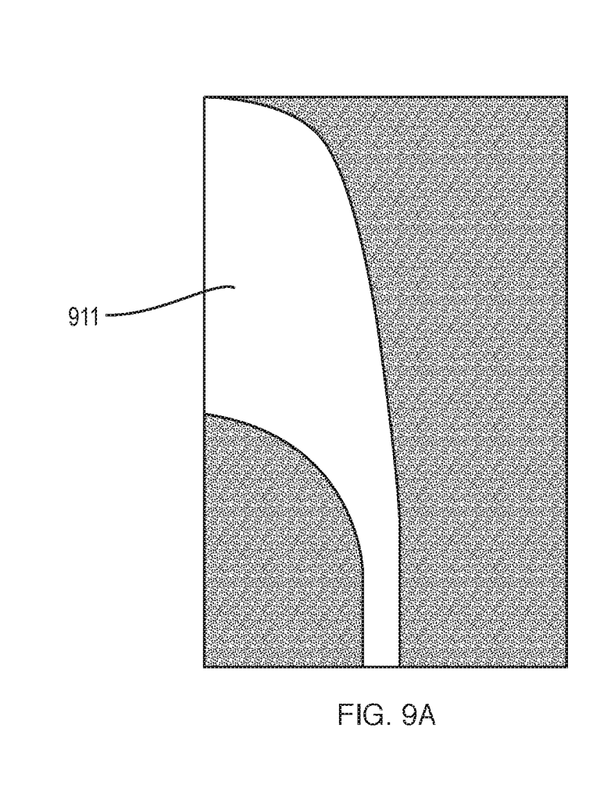
FIGS. 9A and 9B are example diagrams illustrating views of a core structure after removal of sacrificial material according to embodiments herein.
Figure 9B:
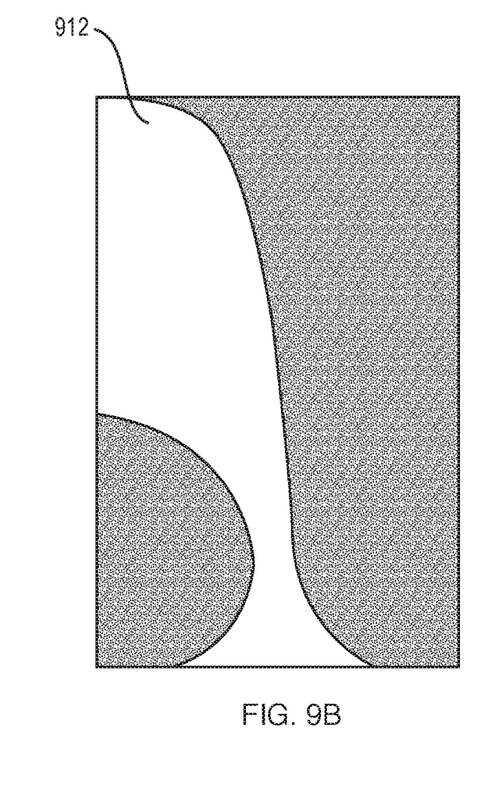

FIGS. 9A and 9B show a vertically-oriented antenna structure (antenna element 911 and antenna element 912) based on a thermoplastic scaffold with a complex metallization pattern.

Figure 10:
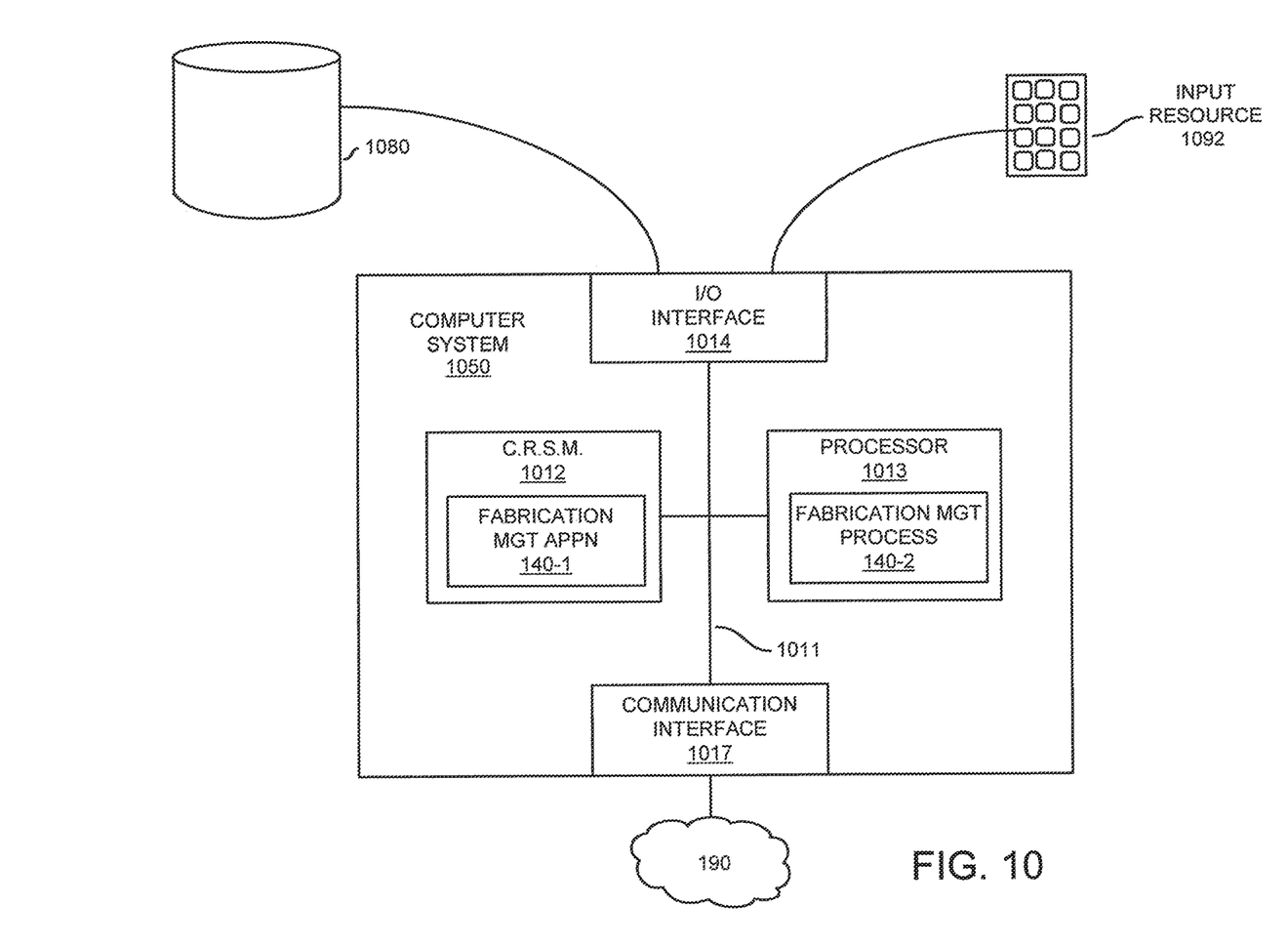
FIG. 10 is a diagram illustrating example computer architecture to execute one or more operations according to embodiments herein.

FIG. 10 is an example block diagram of a computer system for implementing any of the operations as discussed herein according to embodiments herein.

Any of the resources (such as base fabrication manager 140, etc.) as discussed herein can be configured to include computer processor hardware and corresponding executable instructions to carry out the different operations as discussed herein.

As shown, computer system 1050 of the present example can include an interconnect 1011 that couples computer readable storage media 1012 such as a non-transitory type of media (such as a type of hardware storage medium) in which digital information can be stored and retrieved, a processor 1013, I/O interface 1014, and a communications interface 1017.

I/O interface 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with fabrication management application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in network management application 140-1 stored on computer readable storage medium 1012. Execution of the fabrication management application 140-1 produces fabrication management process 140-2 to carry out any of the operations and/or processes as discussed herein.

Those skilled in the art will understand that the computer system 1050 can include other processes and/or software and hardware components, such as an operating system that controls allocation and use of hardware resources to fabrication management application 140-1.

In accordance with different embodiments, note that computer system 1050 may be or included in any of various types of devices, including, but not limited to, a mobile computer, user equipment, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 11. Note that the steps in the flowcharts below can be executed in any suitable order.

Figure 11:
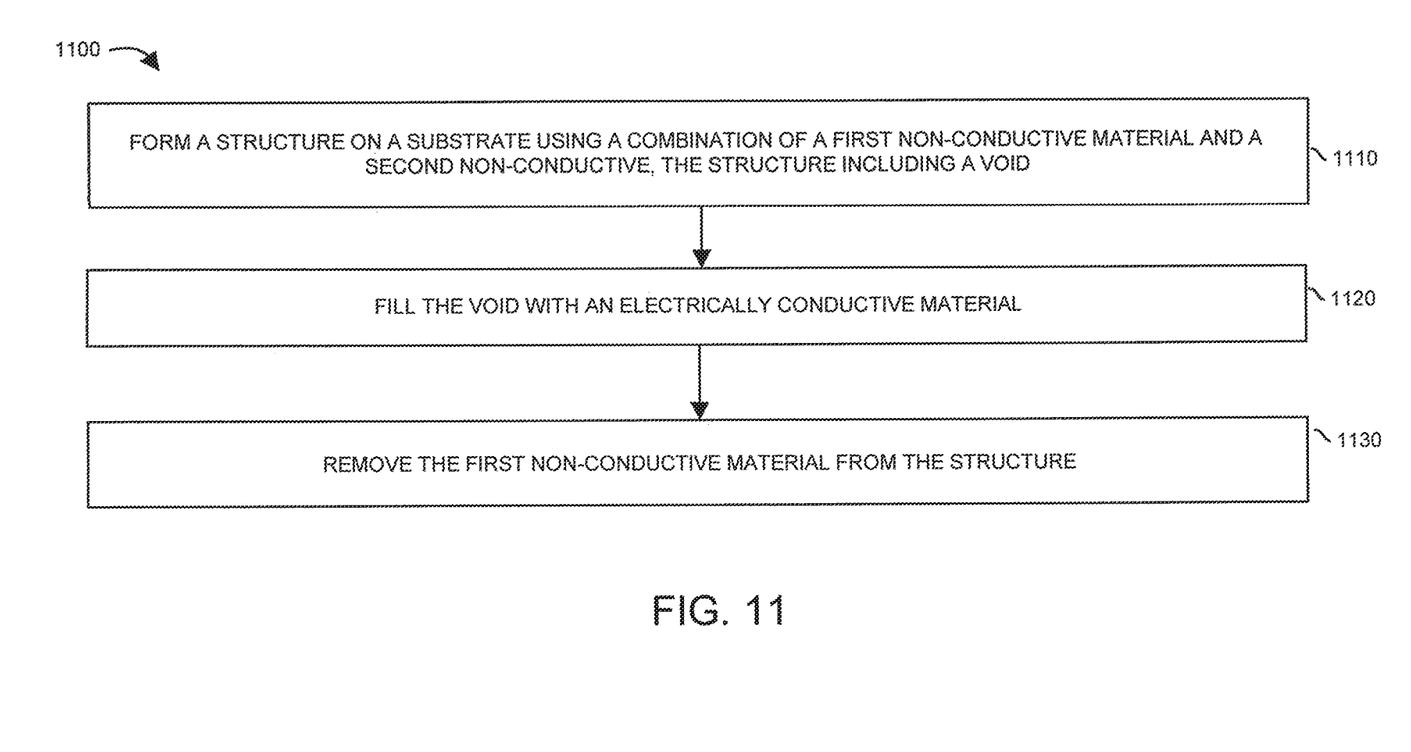
FIG. 11 is an example diagram illustrating a method according to embodiments herein.

FIG. 11 is a flowchart 1100 illustrating an example method according to embodiments. Note that there will be some overlap with respect to concepts as discussed above.

In processing operation 1110, fabrication system 110 forms a structure 200 on a substrate 100 using a combination of a first non-conductive material 221 and a second non-conductive material 222. As previously discussed, the structure 200 includes a void 150 of any shape, size, etc. For example, fabrication system 100 controls dispenser 121 to dispense material 221 (such as sacrificial material). Fabrication system 100 controls dispenser 122 to dispense material 222 (such as non-sacrificial material).

In processing operation 1120, subsequent to generating the structure 200, the fabrication system 110 fills the void 150 with an electrically conductive material 223 via control of dispenser 123.

In processing operation 1130, the fabrication system 110 removes the first non-conductive material 221 from the structure 200 to expose at least a portion of the electrically conductive material 223 filling the void 150.

Note again that techniques as discussed herein are well suited for use in applications supporting generation of structures using layers of different material. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:
1. An additive manufacturing method comprising:
  forming a structure using a combination of a first non-conductive material of a first type and a second non-conductive material of a second type, the structure including the first non-conductive material in contact with the second non-conductive material, the structure including a void disposed between the first non-conductive material and the second non-conductive material;
  wherein forming the structure using the combination of the first non-conductive material of the first type and the second non-conductive material of the second type includes controlling movement of at least one printer head of a 3-D fabricator tool to apply at least one of the first non-conductive material or the second non-conductive material;

filling the void with an electrically conductive material;
removing the first non-conductive material from the structure; and
wherein removing the first non-conductive material from the structure exposes a first lengthwise portion of the electrically conductive material in contact with a first surface of the second non-conductive material while a second lengthwise portion of the electrically conductive material extends through the second non-conductive material.

2. The method as in claim 1, wherein forming the structure using the combination of the first non-conductive material and the second non-conductive material includes:
producing the structure and the void via application of multiple layers of the first non-conductive material and the second non-conductive material via the at least one printer head.

3. The method as in claim 1, wherein the at least one printer head of the 3-D fabricator tool includes a first 3-D printer head; and
wherein forming the structure using the combination of the first non-conductive material and the second non-conductive material includes:
controlling movement of the first 3-D printer head to apply the first non-conductive material, the first non-conductive material being a first fluid plastic; and
controlling movement of a second 3-D printer head to apply the second non-conductive material, the second non-conductive material being a second fluid plastic.

4. The method as in claim 1, wherein exposed surfaces of the first non-conductive material and the second non-conductive material define the void in the structure prior to filling the void with the electrically conductive material.

5. The method as in claim 1, wherein removing the first non-conductive material from the structure includes:
applying a liquid solution to the first non-conductive material in the structure, the liquid dissolving away the first non-conductive material from the structure.

6. The method as in claim 1, wherein removal of the first non-conductive material from the structure exposes a portion of the second non-conductive material and the electrically conductive material filling the void.

7. The method as in claim 1, wherein the first non-conductive material and the second non-conductive material in the structure are solids;
wherein the electrically conductive material cures into a solid; and
wherein the second non-conductive material in the structure provides support for the electrically conductive material after removal of the first non-conductive material from the structure.

8. The method as in claim 1, wherein the electrically conductive material is initially a fluid material; and
wherein filling the void with the electrically conductive material includes: subsequent to creating the structure using the first non-conductive material and the second non-conductive material, forcing the fluid material into the void.

9. The method as in claim 1, wherein forming the structure includes: creating a first port in the structure, the first port providing access to a first terminal end of the void.

10. The method as in claim 9, wherein forming the structure includes: creating a second port in the structure, the second port providing access to a second terminal end of the void; and
wherein filling the void includes: injecting the electrically conductive material into the first port through the void to the second port.

11. The method as in claim 10, wherein the injected electrically conductive material solidifies in the void subsequent to the injection.

12. The method as in claim 1, wherein removing the first non-conductive material from the structure exposes a second surface of the second non-conductive material.

13. The method as in claim 12, wherein removing the first non-conductive material from the structure exposes a first surface of the electrically conductive material.

14. The method as in claim 13, wherein a second surface of the electrically conductive material is in contact with the first surface of the second non-conductive material after removing the first non-conductive material from the structure.

15. The method as in claim 1, wherein the electrically conductive material is in contact with the first non-conductive material and the second non-conductive material after filling the void with the electrically conductive material and prior to removal of the first non-conductive material.

16. The method as in claim 1, wherein the void is a passageway and incudes a first port and a second port prior to removal of the first non-conductive material, the first port disposed at a first terminal end of the passageway, the second port disposed at a second terminal end of the passageway; and
wherein filling the void includes: injecting the electrically conductive material into the first port through the void to the second port.

17. The method as in claim 1, wherein the first lengthwise portion of the electrically conductive material extends in a different direction than the second lengthwise portion of the electrically conductive material.

18. The method as in claim 1, wherein the electrically conductive material is metallic ink.

* * * * *